Jan. 19, 1960  A. G. BODINE, JR  2,921,372
TORSIONAL VIBRATION SONIC DRILL
Filed June 24, 1955  5 Sheets-Sheet 1

INVENTOR.
ALBERT G. BODINE JR.
BY
ATTORNEY

Jan. 19, 1960  A. G. BODINE, JR  2,921,372
TORSIONAL VIBRATION SONIC DRILL
Filed June 24, 1955  5 Sheets-Sheet 2

*INVENTOR.*
ALBERT G. BODINE JR.
BY
ATTORNEY

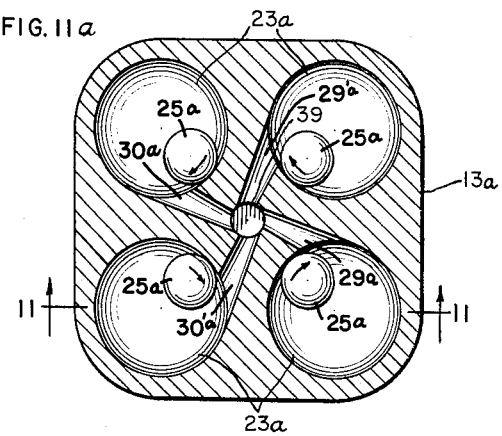
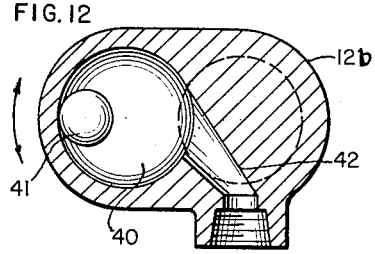
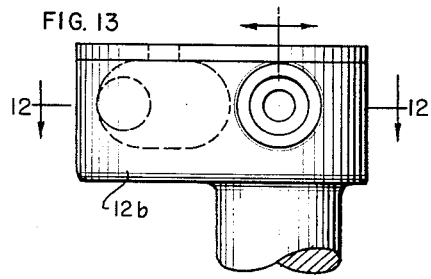
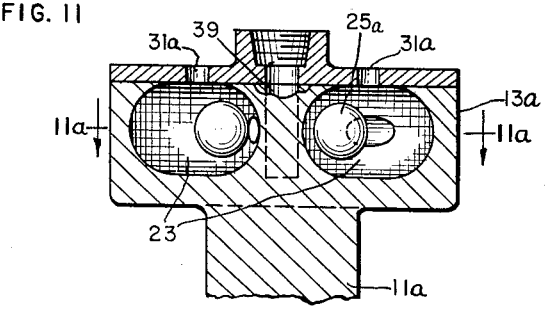
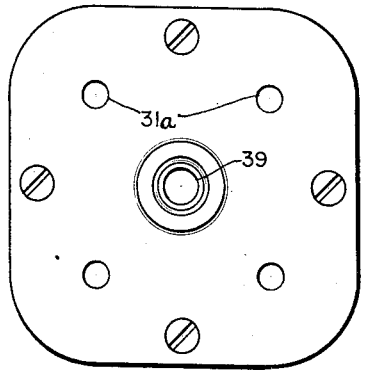
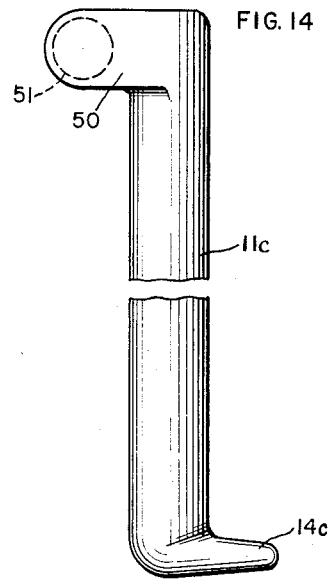
INVENTOR.
ALBERT G. BODINE JR.

Jan. 19, 1960

A. G. BODINE, JR 2,921,372

TORSIONAL VIBRATION SONIC DRILL

Filed June 24, 1955

INVENTOR.
ALBERT G. BODINE JR.
BY
ATTORNEY.

Jan. 19, 1960  A. G. BODINE, JR  2,921,372
TORSIONAL VIBRATION SONIC DRILL
Filed June 24, 1955  5 Sheets-Sheet 5
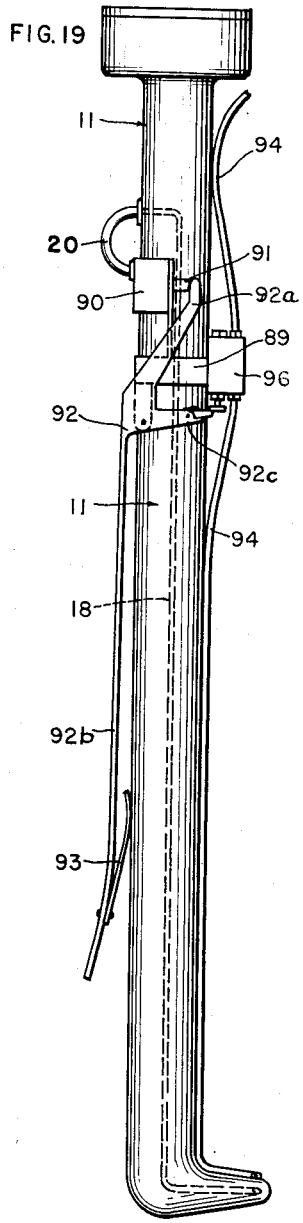
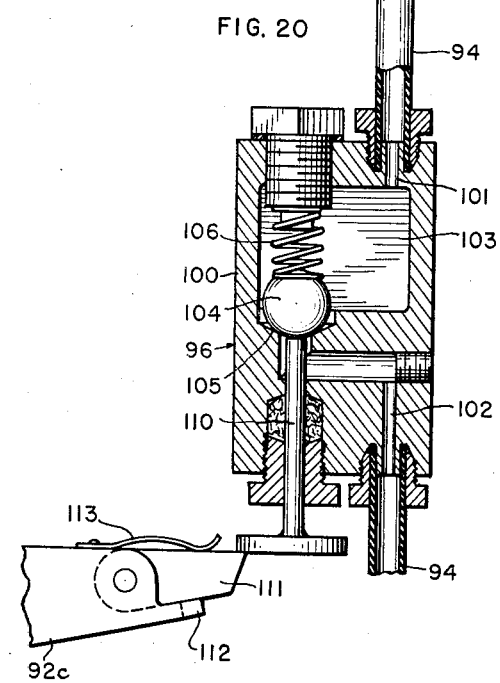
INVENTOR.
ALBERT G. BODINE JR.
BY
ATTORNEY

# United States Patent Office 2,921,372
Patented Jan. 19, 1960

2,921,372

TORSIONAL VIBRATION SONIC DRILL

Albert G. Bodine, Jr., Van Nuys, Calif.

Application June 24, 1955, Serial No. 517,880

17 Claims. (Cl. 32—27)

This invention relates to vibratory drills, typically and illustratively of the small, high frequency sonic type embodying an elastically vibratory shank or bar carrying a drill bit. In the operation of such devices, resonant sonic standing wave patterns are set up in the bar to impart to the bit a high frequency vibratory motion.

Various types of bit may be employed, depending upon the type of material to be drilled. For example, the bit may be a hard material such as tungsten carbide, formed with suitable cutter formations. Fluids or pastes containing fine abrasive particles, for example, tungsten carbide, are often employed with such drills, especially when the bit is made of softer material, the cutting in such case apparently resulting largely, if not entirely, from an oscillatory motion imparted to the abrasive particles by the bit and consequent impacting of the particles against the material to be drilled. Use of fluid suspensions of such abrasive particles for sonic cutting was disclosed in my Reissue Patent No. Re. 23,657. In such case, i.e., use of free abrasive particles in liquid suspension or in pastes, the bit may optionally be smooth-ended without specific cutter formations. Abrasive particles may also be mounted on or embedded in the head of the bit, and one advantageous form comprises such particles embedded in a rubber-like bit head. Still further, with some types of material to be cut, particularly those easily fractured, the material may give way under the action of the bit by vibratory fatique failure, in which case neither discrete cutting formations on the bit nor abrasive particles are required. The vibratory drill of the present invention is designed particularly as a dental drill for cavity preparation, though not necessarily limited thereto.

Earlier drills of the sonic type depended upon longitudinal elastic vibration of the bar. The vibratory action characteristic of this type of drill is not bodily vibration, but vibration characteristic of a free-free bar in which a longitudinal standing wave is set up. One end of such a bar carries the bit, and at the other end of the bar is provided a vibration generator for maintaining the wave action. The bar may typically vibrate in its fundamental or half wavelength mode, in which case the center of the bar stands substantially stationary, and the two half portions of the bar elastically elongate and contract in step with one another.

I have found in my work that sonic vibratory drills have a penetration rate which is closely related to the amplitude of bit vibration. The longitudinally vibratory type of sonic drill is inherently restricted in bit vibration amplitude by its physical configuration. For a given stress at a given cross section of the bar, some definite longitudinal deformation will result, and by tapering the bar towards the bit end, as is sometimes done, this vibration amplitude for a given stress can be correspondingly augmented. See "The Physical and Biological Effects of High Frequency Sound Waves of Great Intensity," Philosophical Mag., s. 7, v. 4, 1927, pp. 417–436. There are limits beyond which this process cannot be carried, however, since the cyclic stress can not be carried to the endurance limit amplitude for the material of the bar without risk of fatigue failure, nor can the bar be made so slender near the bit as to unduly structurally weaken the tool.

A primary object of the present invention is accordingly the provision of a sonic vibratory drill having greatly magnified amplitude of bit vibration.

A further object of the invention is the provision of an improved sonic dental drill having a configuration which is greatly improved for convenience of dental drilling, particularly of certain cavities in locations which are difficult of access by known dental drills, either conventional or sonic.

The sonic drill of the present invention utilizes an elastic bar which may be somewhat similar to that found in previous sonic longitudinally vibratory drills, but a radical departure is made in that the elastic bar is vibrated torsionally instead of longitudinally. That is to say, assuming for preliminary simple illustration the fundamental case of a half wavelength bar, the central section thereof marks the location of a velocity node of torsional vibration, and stands substantially stationary, while the two half portions of the bar oscillate torsionally, turning always in contrary directions, their free ends marking the locations of velocity anti-nodes of torsional vibration. A special torsional vibration generator capable of setting up such torsional oscillation is associated with one end of this bar. In one preferred illustrative embodiment of my invention, designed for the ultimate in bit vibration amplitude, the other end of the bar is formed, in a transverse plane, with a laterally extending arm having an inner radially disposed portion and a reduced outer portion bent substantially at right angles, so as to lie generally tangent to a circle whose center is on the longitudinal torsion axis of the bar. The extremity or tip of this reduced outer end portion of the arm either forms or carries the bit. The bit thus operates at a long radius from the axis of the bar, giving a novel leverage type of vibration amplitude magnification.

In another embodiment of torsional sonic drill in accordance with the invention, the bit is on the bar in an axial position, the bar being tapered toward its juncture with the bit. The bit has laterally facing cutting faces or formations, and it will be seen that these faces or formations, being at a definite radius or lever arm distance from the torsion axis of the tool, attain a large oscillation amplitude. The oscillation amplitude is also magnified by the taper of the bar. The drill in this form has also the unique feature of cyclic direction reversal of the cutting elements of the bit against the material to be penetrated, which is of definite advantage in side wall cutting. It is accordingly a further object of the invention to provide a torsional sonic drill having such characteristics and advantages.

The invention will be better understood by now referring to the following detailed description of various illustrative embodiments thereof, reference for this purpose being had to the accompanying drawings, in which:

Fig. 11 is a view of the upper end portion of a modified embodiment of drill, taken on section line 11—11 of Fig. 11a;

Fig. 11a is a section taken on line 11a—11a of Fig. 11;

Fig. 11b is a top plan view of the drill of Figs. 11 and 11a, looking downward in the aspect of Fig. 11;

Figs. 12 and 13 are similar to Figs. 4 and 5, respectively, but showing a modified single ball torsion generator;

Fig. 14 is a side elevational view to an enlarged scale of a modified form of drill having a magneto-striction type of torsional vibration generator;

Fig. 19 is a side elevational view of a drill in accordance with the invention, equipped with certain auxiliary control devices; and Fig. 20 is a sectional view through a control valve shown in Fig. 19.

Figure 1:
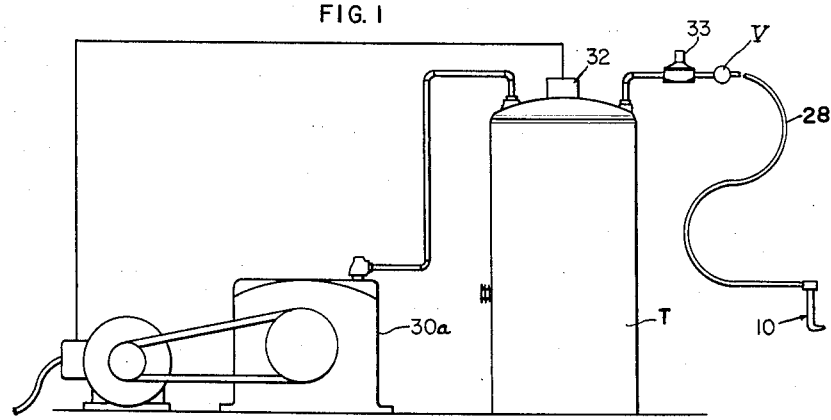
Fig. 1 is a schematic view showing a complete system in accordance with the invention for driving and feeding the drill.
Figure 2:
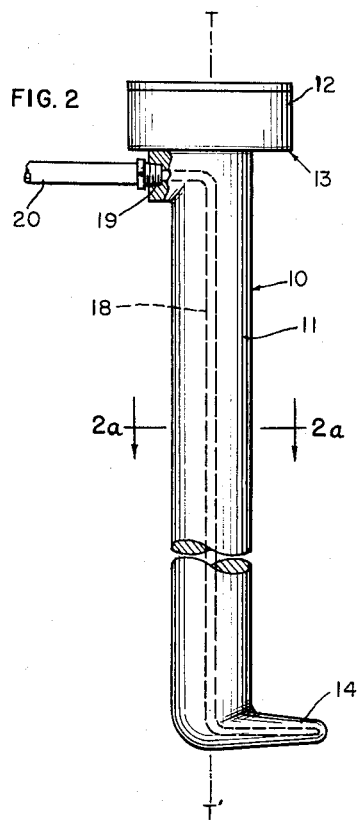
Fig. 2 is an enlarged side elevational view of a present illustrative embodiment of the invention; a section of the shank of the tool being broken out.
Figure 2A:
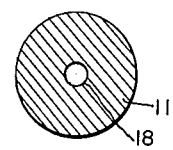
Fig. 2a is a transverse section taken on line 2a—2a of Fig. 2.
Figure 3:
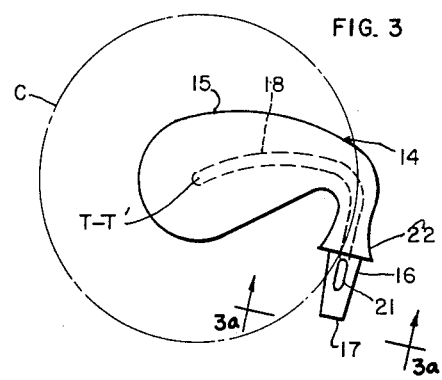
Fig. 3 is a bottom elevational view of the drill of Fig. 2.
Figure 3A:
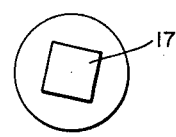
Fig. 3a is a detail taken as indicated by the arrows 3a—3a of Fig. 3.

With reference first to the embodiment shown to a somewhat enlarged scale in Figs. 1–7, the drill, designated generally by the numeral 10, comprises an elastic shank or bar 11 formed of a suitable alloy steel having good elastic fatigue properties, preferably of circular cross section and of a diameter suitable for convenient grasping by the hand of the operator. Typically, though without limitation, the shank 11 may be about 8" in length, and ⅜" in diameter. One end of this shank or bar 11 is formed with an enlarged head or block 12 forming the housing of a torsion vibration generator 13. The other end of the bar 11 is formed with an integral, laterally extending outwardly tapered arm 14, comprising a radial inner portion 15, and an outer portion 16 bent or turned, in a plane transverse to the bar 11, through substantially 90°, so as to lie substantially tangent to a circle C whose center lies on the longitudinal torsion axis T—T' of the bar 11. This torsion axis may be displaced slightly from the longitudinal axis of symmetry of the bar owing to the unbalanced mass of the arm 14. The tip of this right angle bent arm portion 16 may comprise the bit, here designated by the numeral 17; or, as is obvious, separate removable drill bits may be secured to the arm portion 16. The bit in the present case is shown to have a square cross section, Fig. 3a, but it will be understood that the form of the bit is subject to wide variation.

A passage 18, having a port at 19 to which supply hose or tube 20 may be coupled, leads longitudinally through the bar 11 and through the arm 14 to one or more discharge orifices 21 adjacent the bit 17. An abrasive paste, or fluid suspension of abrasive particles, may be fed through this passage 18 and out the orifices 21 to the drill site. A fluid deflector 22 may be located on the arm portion 16 just behind the orifices 21.

The torsion generator 13 is formed, in a plane transverse of the bar, with a pair of circular cavities 23 having concave peripheral bearing surfaces forming raceways 24 for a pair of steel inertia balls 25. Each ball 25 is preferably of materially lesser radius than the radius of transverse curvature of the raceway (see Fig. 4), so as to afford a small area of bearing contact between the ball and the raceway. As here shown, the two raceway cavities 23 are symmetrically spaced on opposite sides of the axis T—T'. In the illustrated construction, the raceway cavities are sunk into generator head or block 12, and are closed at the top by a cover plate 26 secured in position by suitable fastening screws. The block 12 is formed at one side with an air inlet port 27, suitably threaded for coupling to air hose 28. Expanding super-sonic nozzle passages 29 and 30 lead from this port 27 to the two raceway cavities 23, joining the latter tangentially, as shown, it being noted that the tangential inlets to the raceway cavities 23 are so disposed as to introduce the air streams to the two cavities with the same spin direction. Axial air discharge ports 31 exhaust the air from the axial regions of the raceway cavities 23. Air introduced to the two cavities 23 by the passageways described causes the two balls 25 to spin about the raceways, the direction of spin being thus the same for both balls.

The drilling apparatus is completed by an air supply system (Fig. 1) comprising a motor driven compressor 30a, air tank T, pressure switch 32 for controlling the drive of the compressor motor to maintain a predetermined pressure in the tank, and control valve V, by which pressure air is fed to air hose 28. A pressure reducer 33 may in some cases be used between the accumulator and the air hose. A means is also provided for supplying the abrasive bearing fluid or paste to the aforementioned hose 20, one example of which will be described hereinafter.

The air stream tangentially introduced into the two raceway cavities 23 causes the inertia balls 25 to spin about the raceways 24, each ball accordingly exerting a centrifugal force on the generator case. As previously mentioned, the direction of spin of the balls is the same for both. Initially, the balls spin at random phase relations to one another. However, by proper adjustment of the pressure of the air streams driving the balls they are driven at a number of revolutions per second approaching or approximating the resonant frequency of the bar 11 for the desired torsional mode of elastic standing wave vibration. Notwithstanding the initial random phase relations of the balls, an automatic process of phase adjustment of the balls takes place as soon as the spin frequency of one of the balls approaches the resonant frequency of the bar for a mode of torsional standing wave vibration. At the inception of this process, a slight beginning resonant torsional vibration response of the bar enables the bar, by back reaction, to obtain a slight beginning control over the phase relations of the balls, causing the balls to move toward relative positions wherein they coact better with one another to jointly drive the bar in the resonant torsional mode which has been started. The process then very rapidly expands, the torsionally oscillating bar reacting back on the balls to further and further improve their phase relations, and the balls driving the bar harder and harder as their phase relations improve, so that the bar is quickly brought to its maximum amplitude of resonant torsional vibration. In this action, considered in more detail, the two balls automatically seek and find the phase relations of maximum advantage, characterized by linear movement of the balls both longitudinally and laterally of the elongated generator case always in opposition to one another, so that force components both longitudinally and laterally of the generator case are completely balanced. Initial tendency for linear vibration of the generator case in any and all directions is thus neutralized. The balls cooperate with one another, however, to exert an oscillating force couple on the generator about the torsion axis T—T', and therefore also on the corresponding end of the bar 11, which oscillating force couple drives the bar in the desired mode of torsional vibration. To understand the oscillatory force couple action, assume the two balls 25 (Fig. 5) to be passing through the positions illustrated, travelling in the same spin directions (clockwise), though in 180° angular phase opposition relative to one another, this phase relation having been automatically assumed in resonant performance, as explained above. It will now be evident that the two balls exert centrifugal forces on their respective raceways in such directions as to produce additive counterclockwise couples while travelling the first halves of their circuits from the position of Fig. 5, and then additive clockwise couples while travelling the second halves of their circuits, the maximum couples being exerted at the mid-points of the half circuits. The torsional vibration of the bar developed by the resultant oscillating force couple, when generated at the fundamental torsional resonant frequency of the bar, comprises oscillatory torsional deformations, in opposite directions, of the two half-lengths of the bar, the mid-point of which stands substantially stationary. Under these conditions, the balls are "locked in" at the resonant spin frequency, and hold their described phase relations in which a pure couple type of force oscillation is exerted by them on the generator case, driving the elastic bar in the described mode of torsional vibration. As previously described, the balls are controlled, in turn, by back reaction from the bar to hold their resonant spin frequency and the described phase relations. With these conditions established, the torsional vibration of the bar attains its maximum amplitude.

Turning attention now to the end of the bar 11 carrying the arm 14, torsional oscillation of this end portion of the bar about the torsion axis T—T' oscillates the arm 14, and oscillates the bit carried by the right angle bent portion of the arm with substantially or nearly a linear reciprocating motion. Actually, of course, the bit proper oscillates in an arcuate path of radius equal to the distance of the bit from the torsion axis. The small lateral component of motion owing to the arcuate path of oscillation is of no disadvantage, and is even helpful in aiding side wall cutting. A multiplication of bit oscillation stroke amplitude and velocity by a large multiplying ratio is achieved by the use of the laterally projecting arm 14.

Figure 6:
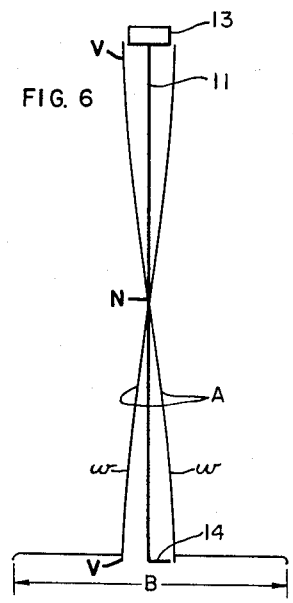
Fig. 6 is a diagram of the drill and of a half wavelength standing wave characteristic thereof.

The half wave mode of torsional resonant vibration described in the foregoing may be represented by the diagram of Fig. 6. Numeral 11 again indicates the bar, numeral 13 the generator, and 14 the lateral or radial arm. The amplitude A of the torsional standing wave in the bar is represented at different points along the bar by the spacing distance between the lines w, and the diagram shows that this amplitude is zero at the mid-point of the bar, which is the location of a velocity node N of the wave, and increases in both directions to maximum values at the two ends of the bar, which are the location of velocity anti-nodes V of the wave. The oscillation amplitude B of the bit on the tip of the arm 14 is also represented in the diagram, and while the diagram is not to scale, it will be seen that owing to the lever arm length of the arm 14, this amplitude B is much greater than the maximum value of A.

Figure 7:
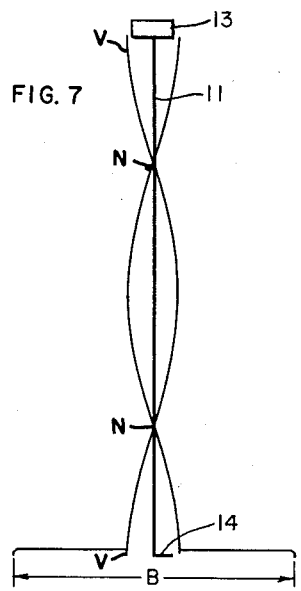
Fig. 7 is a view similar to Fig. 6 but showing a full wave standing wave.

Fig. 7 shows a case in which inertia balls are driven at double speed, so as to achieve a full wavelength standing wave along the bar, with the advantage of doubled vibration frequency. In this case, the two ends and the mid-point of the bar are locations of velocity anti-nodes V, while velocity nodes N are found mid-way between the anti-nodes. The amplitude of the torsional standing wave is again indicated by lines A, and the bit oscillation amplitude by B.

In the operation of the drill, abrasive paste, or abrasive bearing fluid, is fed through the tool to the site to be drilled. The fine abrasive particles are caused by the high frequency oscillation of the bit to be impacted periodically against the surface to be drilled, and the cutting action appears to be due primarily to abrasion of the material by the abrasive particles.

Figure 8:
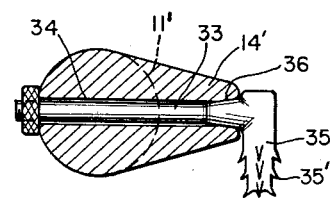
Fig. 8 is a longitudinal section through a modified lateral bit carrying arm of the drill, and showing also a modified bit, the view being at the same enlarged scale as Figs. 2 and 3.

In cases in which the abrasive paste or fluid is not used, the bit may be a detachable unit of hard material, such as tungsten carbide, provided with suitable cutting formations. For example, as shown in Fig. 8, the detachable, hard material bit unit may comprise a shank 33 detachably fitted in a bore 34 extending longitudinally through lateral arm 14' of drill shank 11' and formed at its end with right angle bit element 35. The bore 34 and shank 33 may be tapered at 36 to secure a tight wedge fit, and the shank is furnished at its opposite end with a suitable tightening nut engageable against the butt end of the arm 14', by which the shank may be tightly seated at this taper and thus locked in position. The bit element 35 comprises, in effect, a vibratory milling file, formed with downwardly directed petal-like cutter teeth or ridges 35'.

Figure 9:
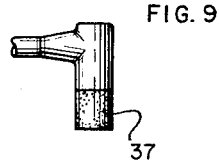
Fig. 9 is a fragmentary view of a modified bit, capable of use in the arm of Fig. 8.

Or, a detachable bit unit may be employed having abrasive particles embedded in its head. The bit unit may in such case be generally made up and fitted into the lateral drill arm in the same fashion as shown in Fig. 8, but its operative end (Fig. 9) comprises a tip 37 composed of rubber or flexible or resilient rubber like material, or a suitable plastic, loaded with abrasive particles. This tip may be vulcanized to the remainder of the bit unit, which may be composed of brass.

Figure 10:
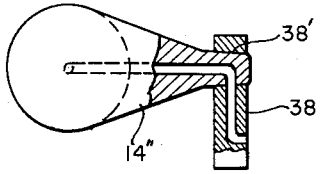
Fig. 10 is a view generally similar to Fig. 8 but showing another modified arm and bit.

For cutting some materials, particularly elastic materials of some brittleness, no abrasive material or even discrete cutting formations are required on the head. The bit may be smooth ended as in Fig. 10, and by bringing it to bear on the surface of the material, the material is set into elastic vibration, and gives way by fracturing owing to elastic fatigue. As further shown in Fig. 10, the bit element, designated by numeral 38, may be composed of brass and may have a tapered opening 38' and be shrunk over the tapered end of the lateral drill arm 14". The arm 14" and bit element may have registering passages, as illustrated, for passage of the abrasive fluid or paste.

Figs. 11, 11a and 11b show an alternative torsion generator 13a having four raceway cavities 23a and four inertia balls 25a, all balls being again driven in the same spin direction by air streams tangentially injected through expanding nozzles 29a, 30a, 29'a and 30'a. The generator case is mounted at the upper end of a shank 11a, as in the case of Fig. 2, and the lower end of shank 11a will be understood to carry a bit, in any of the manners previously explained. Air under pressure is introduced to the generator case at the top, into a central passage 39, and is distributed therefrom to the several nozzles, as shown. Spent air is discharged at 31a. In operation, the several balls synchronize with one another in a manner analogous to that of the earlier described embodiment. The device may be easiest analyzed by treating it as consisting of two pairs of raceway cavities and balls, each of which pairs consists of two cavities located on opposite sides of the torsion axis. It should be evident that each of such pairs will operate as described in the foregoing, and that the oscillatory force couples produced by the two pairs will automatically synchronize to give a single oscillatory force couple driving the bar.

Figure 4:
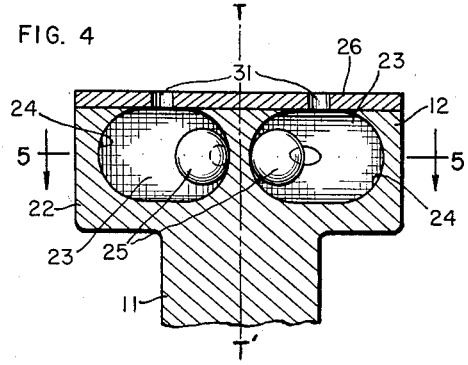
Fig. 4 is a vertical medial section through the vibration generator of the drill of Fig. 2, being taken in accordance with the section line 4—4 of Fig. 5.
Figure 5:
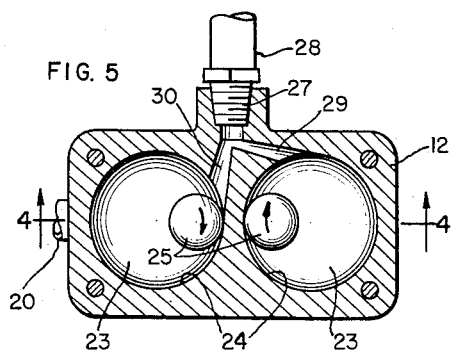
Fig. 5 is a section taken in accordance with the line 5—5 of Fig. 4.

Figs. 12 and 13 are similar to Figs. 4 and 5, but show a modified single ball generator which may be used on the drill of Figs. 1 to 7. Thus the case block 12b has a single raceway cavity 40 containing a single ball 41, and a single nozzle passage 42 extends tangentially into cavity 40 from the air intake port. With this device, the spinning ball sets up torsional vibration of the case and of the elastic bar (such as bar 11 of Fig. 2), and by driving the ball at a resonant frequency for a torsional mode of standing wave vibration, standing waves as described above are attained. Here, however, there is no balancing out of linear components of vibration, and the generator case accordingly vibrates with complex transverse modes, which modes are transmitted the length of the bar and affect the motion of the bit. Such complex or multi-motion transverse modes are of benefit in side wall cutting.

Figure 15:
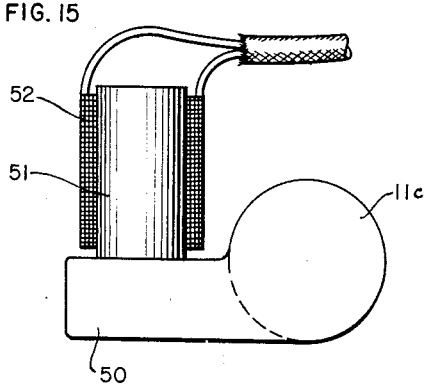
Fig. 15 is a top plan view, to a still further enlarged scale, of the drill shown in Fig. 14.

Figs. 14 and 15 show a drill of the same general character as those earlier described, but provided with a magneto-strictive type of torsional vibration generator. The upper end of the elastic bar 11c is provided with a laterally offset arm or head portion 50, which carried a laminated magneto-strictive bar 51 furnished with an A.C. coil 52 energized with the usual high frequency oscillating current having a polarizing D.C. component. The bar 51 is mounted on the head 50 in such a way that its longitudinal vibration (owing to its alternate lengthening and shortening) exerts an oscillatory force on the head 50 tending to torsionally vibrate the elastic bar 11c. The bar 11c may carry at its opposite end a laterally extending bit carrying arm 14c of the type described earlier herein. The magneto-strictive bar is dimensioned so that for a longitudinally resonant mode thereof it is driven at a frequency equal to the resonant frequency of the bar 11c for its desired torsional mode of vibration. Otherwise, the drill may be similar to those earlier described.

Figure 16:
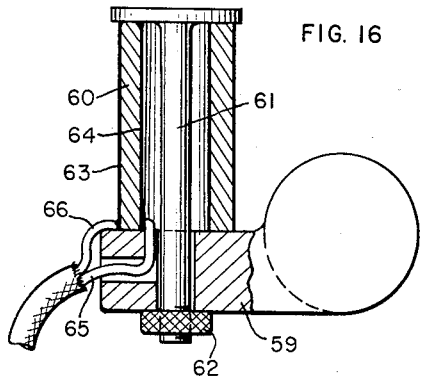
Fig. 16 is a view similar to Fig. 15, but showing another modification.

Fig. 16 similar to Fig. 15 of a modification of the generator of Figs. 14 and 15, the offset head 59 in this case carrying an electrostrictive generator, consisting typically of a barium titanate cylinder 60 secured to the head by headed bolt 61 and nut 62, the cylinder 60 having electrode coatings 63 and 64 on its inner and outer surfaces, to which are connected conductors 65 and 66, and the cylinder 60 shortening and elongating in response to an alternating current voltage impressed across the electrode coatings 63 and 64. The operation of this device is similar to that of the generator described immediately above, excepting for employing an electro-strictive rather than a magneto-strictive driver.

Figure 17:
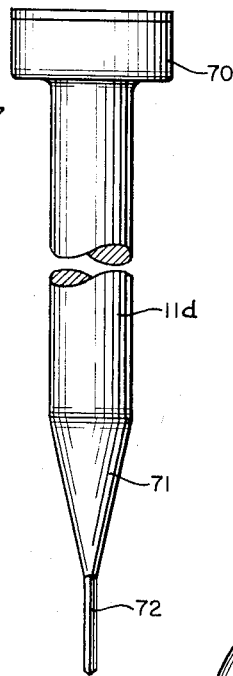
Fig. 17 is a side elevational view of another modification of the invention, having an axially positioned drill bit.

Fig. 17 shows a modified form of drill in accordance with the invention, generally similar to that of Figs. 1 to 7, but having an axially positioned drill bit instead of one carried by a lateral arm. The generator, indicated at 70, may be any of the types heretofore disclosed, or any other capable of producing a suitable oscillating force couple, and an elastic bar 11d is employed, which may be essentially like that of the other embodiments, but which is preferably tapered toward its bit end, as indicated at 71. The bit comprises a reduced axial shank 72 at the end of the bar 11d, and may have, typically, a square cross section. The same type of resonant torsional standing wave vibration is set up in the bar 11d by the generator 70 as earlier described herein. In this case, however, the drill bit, being at the end of the bar in an axial position, is torsionally oscillated on the torsion axis of the bar. The described taper of the bar magnifies the amplitude of torsional oscillation, giving high speed cutting characteristics. Other types of bit may be employed, e.g., a ribbed cylinder, cone or ball, or one carrying abrasive particles.

Figure 18:
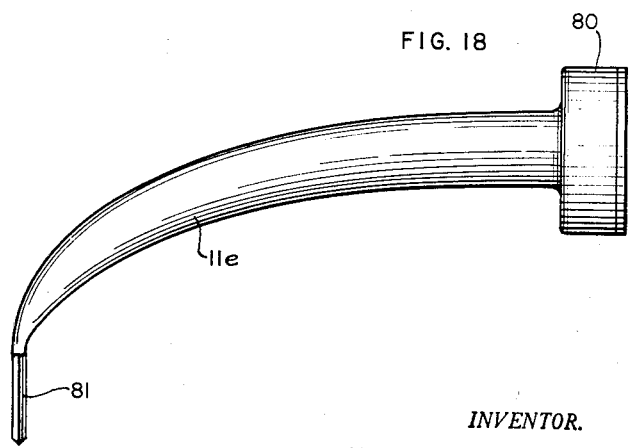
Fig. 18 is a side elevational view of a modification of the drill of Fig. 17.

Fig. 18 shows still a further modification, in which the elastic bar, designated at 11e, and equipped at one end with the usual torsional generator 80, and at the other with an axial bit 81, is curved through 90° from one end to the other for convenient use by the dentist, and is preferably also tapered from its generator end to its bit for amplification of torsional oscillation at the bit end. With the bar 11e of long curvature, it is deemed most advantageous to operate the generator at an overtone frequency, giving a standing wave along the bar which is preferably at least one wavelength long, and which may be two or three wavelengths in length.

With reference now to Figs. 19 and 20, I have provided a means by which the dentist is enabled conveniently to control the flow of both abrasive paste and water to the drilling site. The drill is assumed to be of the type of Figs. 1–5, with a full wave standing wave as represented in Fig. 7. A clamp 89 engages the drill bar or shank 11 at an upper velocity nodal region where the shank is substantially motionless, and supports a paste filled cylinder 90 containing a piston (not shown) having a stem 91 by which it may be depressed to express paste through an outlet into tube 20 feeding drill passage 18. The stem 91 is depressed by the upper arm 92a of a lever 92 fulcrumed on the bar 11 in the upper velocity nodal region, as shown, the lower arm 92b of the lever extending downward along the bar 11 for the convenient depression by the fingers of the dentist as he holds the tool for drilling. A flat return spring 93 holds the lever normally in a non-actuated position.

The lever 92 also has an arm 93c which actuates a water valve 96 carried by the clamp 89 and controlling flow of water through a fine water tube 94 extending along the bar 11, with its discharge end adjacent the bit. A suitable valve is shown in Fig. 20. It has a body 100 with an inlet passage 101 and an outlet passage 102, with a chamber 103 between. A valve ball 104 seats on a valve seat 105 around a discharge passage leading from chamber 103 to outlet 102, and a spring 106 yieldingly holds the ball seated. A trip pin 110 actuated by a pivoted arm 111 carried by lever arm 92c is engageable with ball 104 to displace it from its seat when the arm 92b is depressed. Arm 111 is engageable with a stop extension 112 on the end of lever arm 92c, and is normally held against said extension by spring 113. On the upswing of lever arm 92c, arm 111 acts as a rigid extension thereof. In the course of such upswing, arm 111 engages and elevates the head on the lower end of pin 110, so as to unseat the valve ball and start the flow of water, and then passes on beyond said head permitting the spring 106 to re-seat the ball, and depress the pin. On the downswing of lever 92c, the extension arm 111 pivots against spring 113 in order to pass the head of pin 110.

Thus when the lever arm 92c is rocked counter clockwise, upon depression of lever arm 92b, pin 110 displaces the ball 104 from its seat, allowing water flow through the valve for discharge at the drill site. As the bell crank is rocked still further in the same direction, the arm 92c clears the pin 110, permitting the valve ball to be reseated by its spring, shutting off the water. Further depression of the lower arm 92b of lever 92 then depresses the piston stem to feed abrasive paste through the tool. The water valve is not actuated on the return stroke of the lever 92, as explained above.

It will of course be understood that the specific illustrative embodiments of the invention disclosed in the drawings are merely illustrative, and that various changes in design, structure and arrangement may be made without departing from the spirit and scope of the appended claims.

I claim:

1. In a drill of the character described, the combination of: a torsionally elastic bar, periodic force means coupled to said bar and having a periodic force component directed in torsional relationship to said bar for torsionally elastically oscillating said bar about a longitudinal axis of the bar and having said periodic force at a torsional resonant frequency of the bar, whereby an end portion of said bar is set into torsional oscillation, and a drill bit carried by said end portion of said bar.

2. In a drill of the character described, the combination of: a torsionally elastic bar, periodic force means coupled to said bar and having a periodic force component directed in torsional relationship to said bar for torsionally elastically oscillating said bar about a longitudinal axis of the bar and having said periodic force at a torsional resonant frequency of the bar, whereby an end portion of said bar is set into torsional oscillation, and an arm projecting laterally from said end portion of said bar having an extremity provided with a drill bit.

3. In a drill of the character described, the combination of: a torsionally elastic bar, periodic force means coupled to said bar and having a periodic force component directed in torsional relationship to said bar for torsionally elastically oscillating said bar about a longitudinal axis of the bar and having said periodic force at a torsional resonant frequency of the bar, whereby an end portion of said bar is set into torsional oscillation, and an axially disposed drill bit on said oscillating end portion of said bar.

4. In a drill of the character described, the combination of: a torsionally elastic bar, periodic force means coupled to said bar and having a periodic force component directed in torsional relationship to said bar for torsionally oscillating one end portion of said bar about a longitudinal axis of the bar and having said periodic force at a torsional resonant frequency of the bar, whereby the opposite end portion of said bar is set into torsional oscillation, and a drill bit carried by said opposite end portion of said bar.

5. In a drill of the character described, the combination of: a torsionally elastic bar, periodic force means coupled to said bar and having a periodic force component directed in torsional relationship to said bar for torsionally oscillating one end portion of said bar about a longitudinal axis of the bar and having a said periodic force at a torsional resonant frequency of the bar, whereby the opposite end portion of said bar is set into torsional oscillation, and an arm projecting laterally from said opposite end portion of said bar having an extremity provided with a drill bit.

6. In a drill of the character described, the combination of: a torsionally elastic bar, means for torsionally oscillating one end portion of said bar about a longitudinal axis of the bar at a torsional resonant frequency of the bar, whereby the opposite end portion of said bar is set into torsional oscillation, an arm projecting laterally from said opposite end portion of said bar having an extremity disposed substantially tangent to a circle whose center is on the longitudinal torsion axis of said bar, and a bit element on said arm extremity.

7. In a drill of the character described, the combination of: a torsionally elastic bar, periodic force means coupled to said bar and having a periodic force component directed in torsional relationship to said bar for torsionally oscillating one end portion of said bar about a longitudinal axis of the bar and having said periodic force at a torsional resonant frequency of the bar, whereby the opposite end portion of said bar is set into torsional oscillation, and an axially disposed drill bit on said opposite end portion of said bar.

8. The subject matter of claim 4, wherein said periodic force means for torsionally oscillating one end portion of the bar comprises a vibration generator mounted on said one end portion of said bar and formed with a pair of circular raceway cavities substantially symmetrically disposed in a plane transverse of the bar on opposite sides of the longitudinal torsion axis of the bar, inertia rollers in said cavities, and pressure fluid injection nozzles for introducing pressure fluid tangentially into said cavities with the same spin direction for each, whereby the rollers may be spun in the same direction by such injection of pressure fluid.

9. The subject matter of claim 4, wherein said periodic force means for torsionally oscillating one end portion of the bar comprises an arm projecting laterally from said one end of said bar, and a magneto-striction generator for oscillating said arm with reference to the longitudinal torsion axis of said bar.

10. The subject matter of claim 4, wherein said periodic force means for torsionally oscillating one end portion of the bar comprises an arm projecting laterally from said one end of said bar, and an electro-striction vibration generator for oscillating said arm with reference to the longitudinal torsion axis of said bar.

11. The subject matter of claim 4, wherein said bar is tapered in the direction toward and in the region adjacent said bit.

12. The subject matter of claim 4, wherein said bar has a longitudinal curvature substantially from end to end.

13. In sonic torsional vibration generating and transmitting apparatus, the combination of: an elongated torsionally elastic vibration transmitting member, and periodic force means coupled to said member and having a periodic force component directed in torsional relationship to said member for torsionally elastically oscillating a portion of said member about a longitudinal axis thereof and having said periodic force at a torsional resonant frequency of the bar.

14. A torsional vibration generator for torsionally oscillating a torsionally elastic member, comprising: a generator housing coupled to said bar formed with a pair of circular raceway cavities disposed in a plane transverse to the torsion axis of said member, inertia rollers in said cavities, and pressure fluid injection nozzles for introducing pressure fluid tangentially into said cavities with the same spin direction for driving said rollers around said raceways.

15. A torsional vibration generator for torsionally oscillating a torsionally elastic member, comprising: a generator housing coupled to said bar formed with a circular raceway cavity disposed in a plane transverse to the axis of said member and with its axis laterally offset from the torsion axis of said member, an inertia roller in said cavity, and a pressure fluid injection nozzle for introducing pressure fluid tangentially into said cavity for driving said roller around said raceway.

16. A torsional vibration generator for torsionally oscillating a torsionally elastic member, comprising: a generator housing coupled to said bar formed with a pair of circular raceway cavities disposed in a plane transverse to the torsion axis of said member, inertia rollers in said cavities, and means for spinning said inertia rollers in said cavities with the same spin direction.

17. A torsional vibration generator for torsionally oscillating a torsionally elastic member, comprising: a generator housing coupled to said bar formed with a circular raceway cavity disposed in a plane transverse to the axis of said member and with its axis laterally offset from the torsion axis of said member, an inertia roller in said cavity, and means for spinning said inertia roller in said cavity.

References Cited in the file of this patent

UNITED STATES PATENTS

| | | |
|---|---|---|
| 1,768,377 | Serduke | June 24, 1930 |
| 1,889,153 | Pierce | Nov. 29, 1932 |
| 1,966,446 | Hayes | July 17, 1934 |

FOREIGN PATENTS

| | | |
|---|---|---|
| 1,069,323 | France | Feb. 10, 1954 |